US012585631B1

(12) United States Patent
Patel et al.

(10) Patent No.: US 12,585,631 B1
(45) Date of Patent: **\*Mar. 24, 2026**

(54) DISTRIBUTED LICENSE MANAGEMENT FOR A DATA LIMITED APPLICATION

(71) Applicant: SPLUNK INC., San Francisco, CA (US)

(72) Inventors: Vishal Patel, San Francisco, CA (US); Jimmy John, San Francisco, CA (US); Stephen Phillip Sorkin, San Francisco, CA (US); Johnathon Lee Cervelli, Alameda, CA (US); Mitchell Neuman Blank, Jr., San Francisco, CA (US); Robin Kumar Das, San Carlos, CA (US)

(73) Assignee: Cisco Technology, Inc., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/527,057

(22) Filed: Nov. 15, 2021

Related U.S. Application Data

(63) Continuation of application No. 16/388,812, filed on Apr. 18, 2019, now Pat. No. 11,182,367, which is a
(Continued)

(51) Int. Cl.
*G06Q 20/00* (2012.01)
*G06F 16/22* (2019.01)
(Continued)

(52) U.S. Cl.
CPC ........ *G06F 16/2272* (2019.01); *G06F 21/121* (2013.01); *G06F 21/1078* (2023.08); *G06F 2221/2101* (2013.01); *H04L 2463/101* (2013.01)

(58) Field of Classification Search
CPC .............. G06F 16/2272; G06F 21/121; G06F 2221/0775; G06F 2221/2101; H04L 2463/101
(Continued)

(56) References Cited

U.S. PATENT DOCUMENTS 7,603,318 B1  10/2009  Colosso et al.
7,783,666 B1  8/2010  Zhuge et al.
(Continued)

OTHER PUBLICATIONS

Splunk Enterprise 8.0.0 Overview, available online, retrieved on May 20, 2020 from docs.splunk.com, 17 pages.
(Continued)

*Primary Examiner* — Dante Ravetti
(74) *Attorney, Agent, or Firm* — Rutan & Tucker, LLP; Kyle M. St. James

(57) ABSTRACT

The invention is directed towards enabling data volume and data type based licensing of software in a distributed system of a plurality of remote and/or local nodes. The invention enables measuring and optionally restricting the use of software based on one or more provided licenses that restrict the amount and type of data that may be processed by the software. New and older licenses may be added together for a single, bulk entitlement for a given volume of data processing for one or all types of data. Different users in the same enterprise may combine license entitlements too. Also, a new license can be acquired repeatedly, without requiring the issuance of combined licenses by the issuing authority and/or the revocation of prior licenses.

16 Claims, 8 Drawing Sheets

Related U.S. Application Data continuation of application No. 14/052,563, filed on Oct. 11, 2013, now abandoned, which is a continuation of application No. 13/047,732, filed on Mar. 14, 2011, now Pat. No. 8,589,304.

(51) Int. Cl.
    *G06F 21/12*         (2013.01)
    *G06F 21/10*         (2013.01)

(58) Field of Classification Search
    USPC .......................... 705/16, 21, 59; 380/44, 262
    See application file for complete search history.

(56) References Cited

U.S. PATENT DOCUMENTS

| | | | | |
|---|---|---|---|---|
| 7,849,019 | B2 | 12/2010 | Grimm et al. | |
| 7,865,444 | B1* | 1/2011 | Biswas | G06F 21/105 |
| | | | | 705/79 |
| 7,899,166 | B1* | 3/2011 | Ravindranath | H04M 17/00 |
| | | | | 455/406 |
| 7,937,344 | B2 | 5/2011 | Baum et al. | |
| 8,046,366 | B1 | 10/2011 | Perrin et al. | |
| 8,112,425 | B2 | 2/2012 | Baum et al. | |
| 8,751,529 | B2 | 6/2014 | Zhang et al. | |
| 8,788,525 | B2 | 7/2014 | Neels et al. | |
| 9,215,240 | B2 | 12/2015 | Merza et al. | |
| 9,286,413 | B1 | 3/2016 | Coates et al. | |
| 10,127,258 | B2 | 11/2018 | Lamas et al. | |
| 2001/0013024 | A1* | 8/2001 | Takahashi | G06F 21/10 |
| | | | | 705/59 |
| 2002/0022971 | A1* | 2/2002 | Tanaka | G06Q 30/04 |
| | | | | 705/26.1 |
| 2003/0189591 | A1* | 10/2003 | Mo | G06F 21/34 |
| | | | | 715/738 |
| 2006/0059253 | A1* | 3/2006 | Goodman | G06Q 10/10 |
| | | | | 709/223 |
| 2006/0190647 | A1 | 8/2006 | Asano et al. | |
| 2006/0190774 | A1 | 8/2006 | Mitchell | |
| 2007/0156855 | A1 | 7/2007 | Johnson | |
| 2007/0179900 | A1* | 8/2007 | Daase | G06F 21/10 |
| | | | | 705/59 |
| 2007/0245409 | A1* | 10/2007 | Harris | H04L 67/06 |
| | | | | 726/5 |
| 2007/0272105 | A1 | 11/2007 | Burgess et al. | |
| 2008/0148253 | A1* | 6/2008 | Badwe | G06F 21/1078 |
| | | | | 717/174 |
| 2008/0208831 | A1 | 8/2008 | Farago et al. | |
| 2008/0228574 | A1 | 9/2008 | Stewart et al. | |
| 2008/0289006 | A1 | 11/2008 | Hock et al. | |
| 2009/0083750 | A1 | 3/2009 | Wang | |
| 2009/0119673 | A1 | 5/2009 | Bubba | |
| 2010/0031157 | A1 | 2/2010 | Neer et al. | |
| 2010/0333214 | A1 | 12/2010 | Tsuboi | |
| 2011/0066606 | A1* | 3/2011 | Fox | G06F 16/9038 |
| | | | | 707/706 |
| 2011/0119088 | A1 | 5/2011 | Gunn | |
| 2011/0307579 | A1 | 12/2011 | Izrailevsky et al. | |
| 2019/0098106 | A1 | 3/2019 | Mungel et al. | |

OTHER PUBLICATIONS

Splunk Cloud 8.0.2004 User Manual, available online, retrieved on May 20, 2020 from docs.splunk.com, 66 pages.
Splunk Quick Reference Guide, updated 2019, available online at https://www.splunk.com/pdfs/solution-guides/splunk- quick-reference-guide.pdf, retrieved on May 20, 2020, 6 pages.
Carraso, David, "Exploring Splunk," published by CITO Research, New York, NY, Apr. 2012, 156 pages.
Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

*100*

*102*

*101*

*103*

Client Device

Client Device

Client Device

Wide Area
Network /
Local Area
Network –
(Network)

*107*

*109*

Distributed Licensing Manager (DLM)

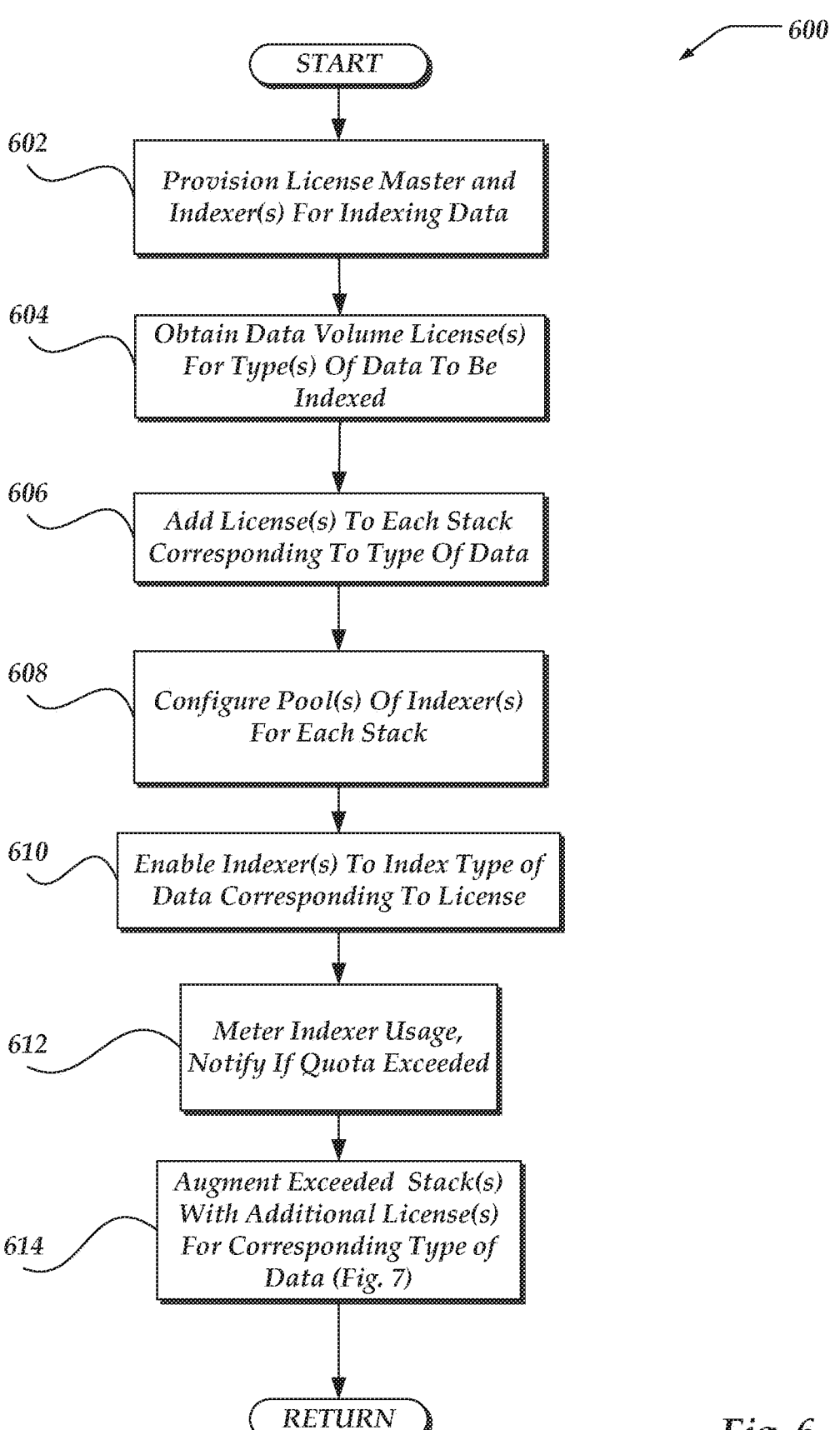

*600*

START

*602*    Provision License Master and Indexer(s) For Indexing Data

*604*    Obtain Data Volume License(s) For Type(s) Of Data To Be Indexed

*606*    Add License(s) To Each Stack Corresponding To Type Of Data

*608*    Configure Pool(s) Of Indexer(s) For Each Stack

*610*    Enable Indexer(s) To Index Type of Data Corresponding To License

*612*    Meter Indexer Usage, Notify If Quota Exceeded

*614*    Augment Exceeded Stack(s) With Additional License(s) For Corresponding Type of Data (Fig. 7)

RETURN

*Fig. 6*

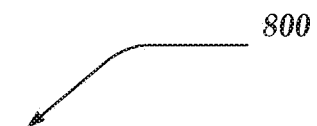

```
<?xml version="1.0" encoding="UTF-8"?>
<license>
 <signature>signature-of-payload</signature>
 <payload>
    <type>enterprise</type>
    <group_id>Enterprise</group_id>
    <quota>100000000000</quota>
    <max_violations>7</max_violations>
    <window_period>30</window_period>
    <creation_time>1277017200</creation_time>
    <expiration_time>1295895803</expiration_time>
    <label>Foobar Enterprise</label>
    <features>
       <feature>Auth</feature>
       <feature>FwdData</feature>
       <feature>RcvData</feature>
       <feature>LocalSearch</feature>
       <feature>DistSearch</feature>
       <feature>RcvSearch</feature>
       <feature>ScheduledSearch</feature>
       <feature>Alerting</feature>
       <feature>DeployClient</feature>
       <feature>DeployServer</feature>
       <feature>SplunkWeb</feature>
       <feature>SigningProcessor</feature>
       <feature>SyslogOutputProcessor</feature>
       <feature>AllowDuplicateKeys</feature>
    </features>
    <sourcetypes/>
         <sourcetype>Enterprise</sourcetype>
         <sourcetype>Mail System</sourcetype>
         <sourcetype>Foo</sourcetype>
    <sourcetypes/>
  <guid>2CC6728A-D2F1-44D9-B0BA-386151CD2AA8</guid></payload>
</license>
```

*Fig. 8*

DISTRIBUTED LICENSE MANAGEMENT FOR A DATA LIMITED APPLICATION

CROSS-REFERENCE TO RELATED APPLICATIONS

This application is a continuation/divisional of the co-pending U.S. patent application titled, "DISTRIBUTED LICENSE MANAGEMENT FOR A DATA LIMITED APPLICATION," filed on Apr. 18, 2019 and having Ser. No. 16/388,812, which is a continuation of U.S. patent application titled, "DISTRIBUTED LICENSE MANAGEMENT FOR A DATA LIMITED APPLICATION," filed on Oct. 11, 2013, and having Ser. No. 14/052,563, which is a continuation of U.S. patent application titled, "A SYSTEM AND METHOD FOR CONTROLLING THE INDEXING OF VOLUME BETWEEN NETWORK DEVICES," filed on Mar. 14, 2011, and having Ser. No. 13/047,732, issued as U.S. Pat. No. 8,589,304. The subject matter of these related applications is hereby incorporated herein by reference.

TECHNICAL FIELD

The invention is directed to licensing an application for use by a customer, and more particularly, to managing a licensed volume and type of data that is processed by a distributed application.

BACKGROUND

Many software licensing facilities control the use and installation of software based on the number of devices or nodes that are enabled to use it. Also, many companies use software on a variety of distributed systems that can range from a single computer for a small business to a collection of servers and a plurality of user computer nodes for a large corporation. Also, the volume of data processed by a node in a small business can be a magnitude less than the volume of data processed by a node in a large corporation.

Additionally, the type of data processed by large and small business can vary widely, such as sending and receiving messages, creating and storing documents, hosting web sites, database searches, facilitating online transactions, and the like. Furthermore, the expense of developing and maintaining software that can handle the type and volume of data processed by a large corporation can be substantially greater than the effort expended to do somewhat the same for a small business. Consequently, determining a price for the licensing of software for different sizes of businesses with different volumes of data and types of data can be difficult. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 6 shows a logical flow diagram generally illustrating at least one embodiment of a process for handling types of data and volumes for distributed licenses;

FIG. 8 shows an exemplary embodiment of a license, in accordance with the invention.

DETAILED DESCRIPTION

Figure 1:
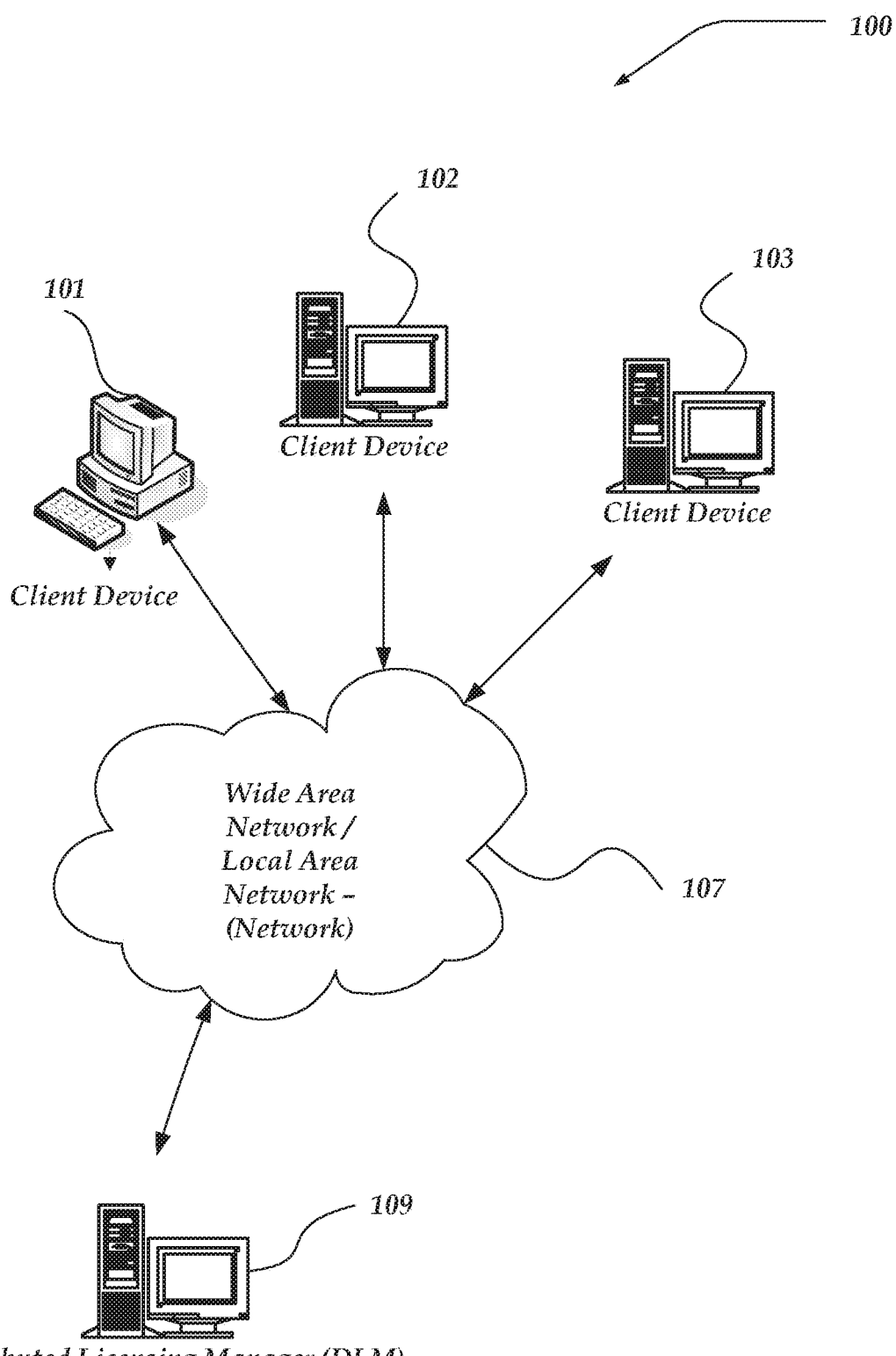
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "event data" refers to computing data that is collected about an event for a computing system, including, for example, an action, characteristic, condition (or state) of the computing system. For example, such events may be about a computing system's performance, actions taken by the computing system, or the like. Event data may be obtained from various computing log files generated by the computer's operating system, and/or other monitoring application. However, event data is not restricted by a file format or structure from which the event data is obtained. In one embodiment, event data may have metadata associated with it.

As used herein, the term "metadata" refers to a plurality of features that characterize event data. Such metadata includes, for example, a computer host from which the event data is obtained, or otherwise associated with; a timestamp associated with the event data; a file name or source name with which the event data is associated; a source type for the event data; and the like. A source type may refer to whether the event data is from a log file, a system metric, or some other data type.

As used herein, the term "License" refers to a single, atomic entity that defines entitlements such as feature enablement, indexing byte quota, and the like. A license may be generated via a template. Typically, each template would have a fixed set of features turned either on or off. In this manner, control is provided for the different types of licenses that are released to licensees such as customers. Also, creating a new license for a future feature is simplified by the use of a template license. In at least one embodiment, at least some licenses may be embedded in an application so that if no external licenses are available, the application can use one or more embedded licenses to operate at least partially, e.g., a free license and a forwarder license. See FIG. 8 for a sample license template file.

As used herein, the term "Stack" refers to a collection of licenses with the same "type", e.g., the same StackId. The stack manages the logical combining of multiple licenses, whether it is adding up indexing byte quota or presenting a single set of the features enabled by its collection of licenses. Some stacks are stackable, such as a stack used in an Enterprise, while other stacks are not, e.g., a Free license stack, a Forwarder of data license stack, and a Download-Free Trial stack.

As used herein, the term "Pool" is somewhat similar, albeit different, to partitioning a disk volume, e.g., a pool logically partitions a stack. The logical partitioning may be used to divvy up license privileges to groups of slave computers. The pools can be allocated to specific indexers or configured to accept any indexer that connects to it. A default pool for licenses is typically created on startup so that an application is ready to perform right away.

As used herein, the terms "Stack Group", or "Group" refers to one or more stacks. Each stack is typically a member of a single group. And for at least one embodiment, just one group is active at any given time. Also, an "Enterprise" group often includes more than one stack such as an enterprise stack and one or more fixed source stacks. Additionally, some stacks may map to their own particular group. The Group enables multiple stacks of licenses to be active for a given time.

As used herein the term "Feature" refers to those features that a license enables for use by a customer. For example, a "local search" feature enables a customer to search over their data, an authentication or "auth" feature enables an administrator to create different users with different access controls. Typically, each license contains a list of one or more features that it enables. A particular feature is enabled if a valid license is sold/provided to the customer that indicates that this feature is enabled. A list of at least some features may include: (1) Auth—authentication; (2) FwdData—allows instance to forward data; (3) RcvData—allows instance to receive data; (4) LocalSearch—enables searching of local indexed data; (5) DistSearch—enables searching across distributed peers; (6) RcvSearch—allows instance to act as search peer; (7) ScheduledSearch—enables schedule searches; (8) Alerting—enables alerting on searches; (9) DeployClient—allows instance to be a deployment client; (10) DeployServer—allows instance to be a deployment server; (11) Web—allows instance to bring up web interface; (12) SyslogOutputProcessor—enables syslog forwarding; and (13) SigningProcessor—enables signing.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards enabling data volume and data type based licensing of software in a distributed system of a plurality of remote and/or local nodes. The invention enables measuring and optionally restricting the use of software based on one or more provided licenses that restrict the amount and type of data that may be processed by the software. New and older licenses may be added together for a single, bulk entitlement for a given volume of data processing for one or all types of data. Different users in the same enterprise may combine license entitlements too. Also, a new license can be acquired repeatedly, without requiring the issuance of combined licenses by the issuing authority and/or the revocation of prior licenses.

In at least one embodiment, license entitlements may be shared collectively, or divided across, multiple nodes or groups of nodes. A user may allocate entitlement to groups of nodes so that they may collectively process data, without the limitation that the systems be individually licensed nor limited to a fixed fraction of the total licensed entitlement. However, in at least one embodiment, explicit allocation of a specific license entitlement may be assigned to one or more individual nodes.

Also, in at least one embodiment, different types of data may be separately and differently treated based on its structure, content or source for measurement of its licensed amount of data flow. Additionally, a type of data may be licensed or metered for data flow based on where, when, what and/or how it was created, and it is not known a priori on which node the data may be processed. In at least one embodiment, the most data type specific license is metered before a license that allows processing of more general types of data.

Furthermore, in at least one embodiment, a corrective action is provided if a licensed entitlement is exceeded, such as displaying a warning or notification, disabling one or more features, until the licensed entitlement is increased, e.g., another license for additional data flow is purchased. Additionally, in at least one embodiment, a license can include a collection of features which can be turned on or off during the license creation process. In this way, a license can be custom tailored to the needs of a particular customer. Moreover, a combination of each of the embodiments briefly discussed herein enable efficient licensing of software for distributed systems based on at least one of data type and a volume of data.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 107, Slave devices 101-103, and Distributed Licensing Manager Device (DLM) 109.

One embodiment of client devices 101-103 is described in more detail below in conjunction with FIG. 2. Generally, however, client devices 101-103 may include virtually any computing device capable of communicating over a network to send and receive information, including event data and related metadata, performing various online activities, offline actions, or the like. In one embodiment, one or more of client devices 101-103 may be configured to operate within a business or other entity to perform a variety of services for the business or other entity. For example, client devices 101-103 may be configured to operate as a web server, an accounting server, a production server, an inventory server, an indexer of data, or the like. However, client devices 101-103 are not constrained to these services and may also be employed, for example, as an end-user computing node, in other embodiments. Further, it should be recognized that more or less client devices may be included within a system such as described herein, and embodiments are therefore not constrained by the number or type of client devices employed.

The set of such devices may include devices that typically connect using a wired or wireless communications medium such as personal computers, servers, multiprocessor systems, microprocessor-based or programmable consumer electronics, network PCs, or the like. In one embodiment, at least some of client devices 101-103 may operate over wired and/or wireless network. In some embodiments, client devices 101-103 may include virtually any portable computing device capable of receiving and sending a message over a network, such as network 107.

Client devices 101-103 also may include at least one other client application that is configured to receive and/or send data, including event data and/or related metadata, between another computing device. The client application may include a capability to provide, index, and/or to receive requests for event data and/or related metadata, or the like. However, the client application need not be limited to merely providing indexed event data and related metadata, and may also provide other information, and/or provide for a variety of other services, including, for example, monitoring for events within and/or between client devices.

The client application may further provide information that identifies itself, including a type, capability, name, and the like. Such information may be provided in a network packet, or the like, sent between other client devices, DLM 109, or other computing devices.

Client devices 101-103 may further be configured to include a client application that enables an end-user to log into an end-user account that may be managed by another computing device, such as DLM 109, or the like. Such end-user account, in one non-limiting example, may be configured to enable the end-user to search for event data. However, participation in such activities may also be performed without logging into the end-user account.

Network 107 is configured to couple network devices with other computing devices, including, DLM 109, and client devices 101-103. Network 107 is enabled to employ any form of computer readable media for communicating information from one electronic device to another. Also, network 107 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 107 may be configured to transport information of an Internet Protocol (IP). In essence, network 107 includes any communication method by which information may travel between computing devices.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

In some embodiments, network 107 may be further configurable as a wireless network, which may further employ a plurality of access technologies including 2nd (2G), 3rd (3G), 4th (4G), 5.sup.th (5G) generation radio access for cellular systems, WLAN, Wireless Router (WR) mesh, and the like. In one non-limiting example, network 107, when configured as a wireless network, may enable a radio connection through a radio network access such as Global System for Mobile communication (GSM), General Packet Radio Services (GPRS), Enhanced Data GSM Environment (EDGE), Wideband Code Division Multiple Access (WCDMA), and the like.

DLM 109 includes virtually any network device usable to operate to receive and/or analyze event data from client devices 101-103. DLM 109 may, for example, be configured to perform management of licenses for metering different types of data that are indexed for a corresponding flow of data. In one embodiment, a license is received by DLM 109 for a particular type of data and a volume of data to be indexed. Also, in at least one embodiment, the DLM enables a plurality of licenses of substantially the same type to be aggregated into a stack of licenses. The entitlement provided by the stack of licenses may be assigned to a particular client device or a pool of client devices.

DLM 109 may employ processes such as described below in conjunction with FIGS. 4-8 to perform at least some of its actions. Devices that may operate as DLM 109 include various network devices, including, but not limited to personal computers, desktop computers, multiprocessor systems, microprocessor-based or programmable consumer electronics, network PCs, server devices, network appliances, and the like.

Although FIG. 1 illustrates DLM 109 as a single computing device, the invention is not so limited. For example, one or more functions of the DLM 109 may be distributed across one or more distinct network devices. Moreover, DLM 109 is not limited to a particular configuration. Thus, in one embodiment, DLM 109 may contain a plurality of network devices to perform compressed journaling and/or replication or recovery. Similarly, in another embodiment, DLM 109 may contain a plurality of network devices that operate using a master/slave approach, where one of the plurality of network devices of DLM 109 operates to manage and/or otherwise coordinate operations of the other network devices. In other embodiments, the DLM 109 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Device

Figure 2:
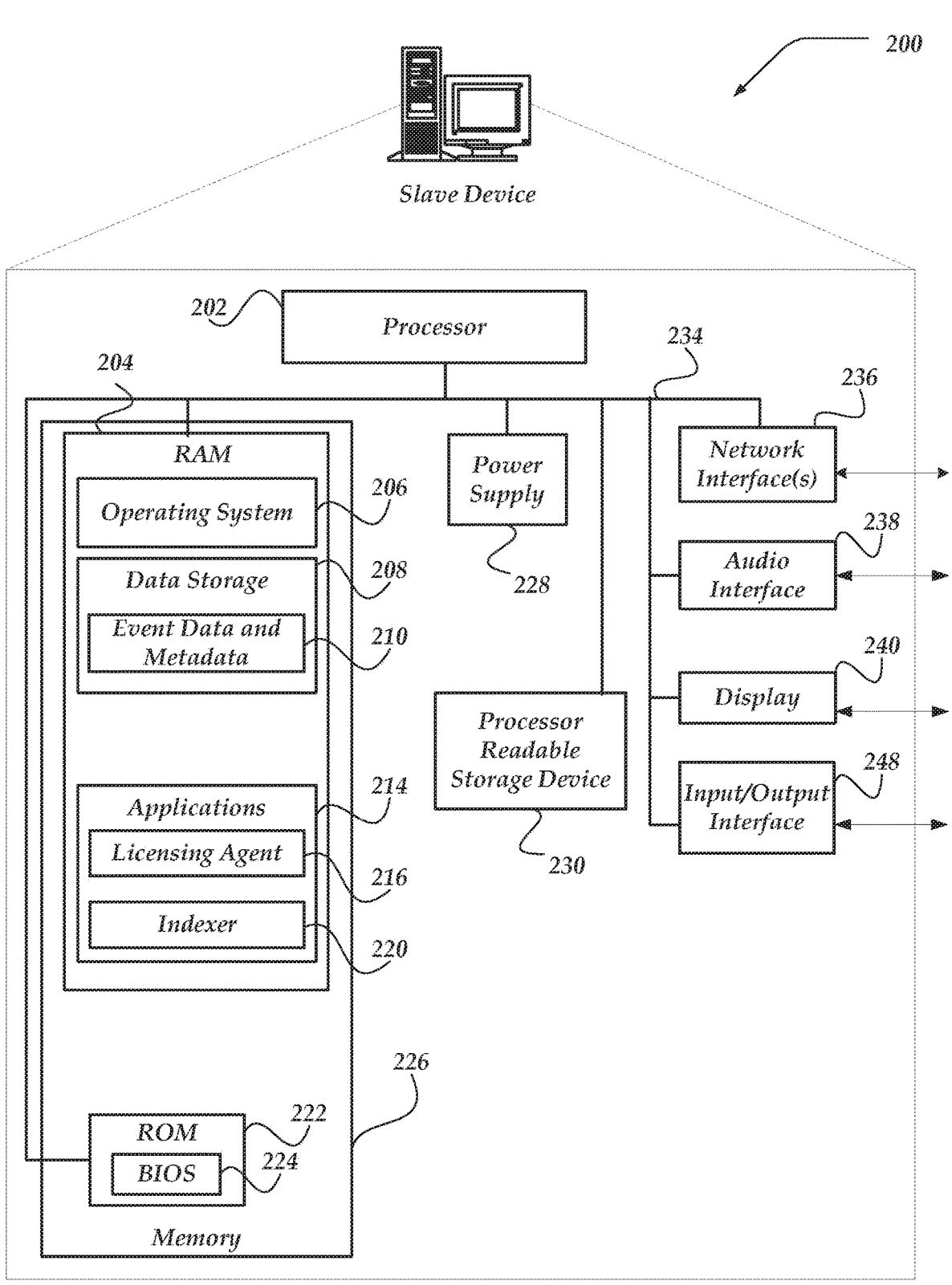
FIG. 2 shows an embodiment of a client device that may be included in a system such as that shown in FIG. 1.

FIG. 2 shows one embodiment of client device 200 that may be included in a system implementing embodiments of the invention. Client device 200 may include many more or less components than those shown in FIG. 2. However, the components shown are sufficient to disclose an illustrative embodiment for practicing the present invention. Client device 200 may represent, for example, one embodiment of at least one of client devices 101-103 of FIG. 1.

As shown in the figure, client device 200 includes processor 202 in communication with a mass memory 226 via a bus 234. Client device 200 also includes a power supply 228, one or more network interfaces 236, an audio interface 238, a display 240, and an input/output interface 248. Power supply 228 provides power to client device 200.

Network interface 236 includes circuitry for coupling client device 200 to one or more networks, and is constructed for use with one or more communication protocols and technologies including, but not limited to, 2nd (2G), 3rd (3G), 4th (4G), and 5.sup.th (5G) generation radio access for cellular systems, global system for mobile communication (GSM), code division multiple access (CDMA), time division multiple access (TDMA), Universal Mobile Telecommunication System (UMTS), High Speed Downlink Packet Access (HSDPA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display (LCD), gas plasma, light emitting diode (LED), or any other type of display used with a computing device. Display 240 may also include a touch sensitive screen arranged to receive input from an object such as a stylus or a digit from a human hand.

Client device 200 also comprises input/output interface 248 for communicating with external devices, such as a keyboard, or other input or output devices not shown in FIG. 2. Input/output interface 248 can utilize one or more communication technologies, such as USB, infrared, Bluetooth™, or the like.

Mass memory 226 includes a RAM 204, a ROM 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client device 200. The mass memory also stores an operating system 206 for controlling the operation of client device 200. It will be appreciated that this component may include a general-purpose operating system such as a version of UNIX, or LINUX™, or a specialized client communication operating system such as Windows Mobile™, Google Android™, Apple iOS™, or the Symbian® operating system. The operating system may include, or interface with a Java virtual machine module that enables control of hardware components and/or operating system operations via Java application programs.

Mass memory 226 further includes one or more data storage 208, which can be utilized by client device 200 to store, among other things, applications 214 and/or other data. For example, data storage 208 may also be employed to store information that describes various capabilities of client device 200. The information may then be provided to another device based on any of a variety of events, including being sent as part of a header during a communication, sent upon request, or the like. At least a portion of the information may also be stored on a disk drive or other computer-readable storage device 230 within client device 200. Data storage 208 may further store event data and metadata 212. Such event data and metadata 212 may also be stored within any of a variety of other processor-readable storage devices, including, but not limited to a hard drive, a portable storage device, a flash drive, a DVD/CD-ROM, tape drive, or the like, such as illustrated by processor-readable storage device 230.

Applications 214 may include computer executable instructions which, when executed by client device 200, transmit, receive, and/or otherwise process network data. Other examples of application programs include calendars, search programs, email clients, IM applications, SMS applications, VOIP applications, contact managers, task managers, transcoders, database programs, word processing programs, security applications, spreadsheet programs, games, search programs, data log recording programs, and so forth. Applications 214 may include, for example, Data Indexer 220 and Licensing Agent 216. Data Indexer 220 is configured to index data, such as event data and metadata 210 based on licensed entitlements managed by another network device, such as DLM 109 of FIG. 1. The indexed event data and metadata may be sent to DLM 109 based on a request from DLM 109, or other network device. However, the indexed event data and metadata may also be sent based on a time, change in a state of client device 200, or any of a variety of other criteria. Licensing Agent 216 is in communication with Indexer 220 and DLM 109, and provides DLM 109 with monitored information regarding the volume and type of data that is indexed at the client device. DLM 109 operates as a master to licensing agent 216 which is configured to operate as a slave.

Illustrative Network Device

Figure 3:
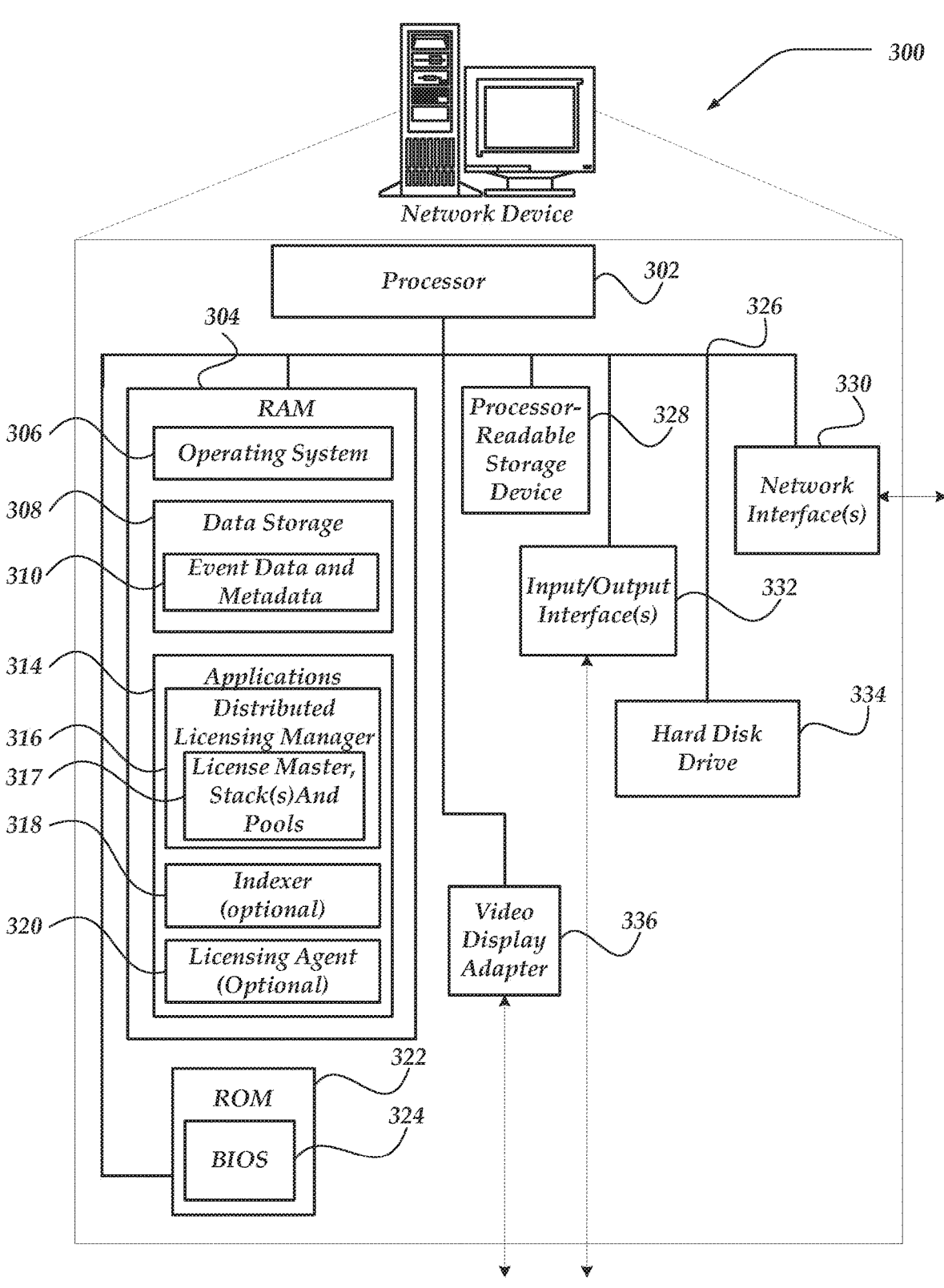
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, or any other device. Network device 300 may represent, for example DLM 109 of FIG. 1.

Network device 300 includes processor unit 302, an input/output interface 332, video display adapter 336, and a mass memory, all in communication with each other via bus 326. The mass memory generally includes RAM 304, ROM 322 and one or more permanent mass storage devices, such as hard disk drive 334, tape drive, optical drive, and/or floppy disk drive. The mass memory stores operating system 306 for controlling the operation of network device 300. Any general-purpose operating system may be employed. Basic input/output system ("BIOS") 324 is also provided for controlling the low-level operation of network device 300. As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

The mass memory as described above illustrates another type of computer-readable media, namely computer-readable storage media and/or processor-readable storage medium. Computer-readable storage media (devices) may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory physical medium which can be used to store the desired information and which can be accessed by a computing device.

As shown, data storage 308 may include a database, text, spreadsheet, folder, file, or the like, that may be configured to maintain and store user account identifiers, user profiles, email addresses, IM addresses, and/or other network addresses; or the like. Data stores 308 may further include program code, data, algorithms, and the like, for use by a processor, such as processor 302 to execute and perform actions. In one embodiment, at least some of data store 308 might also be stored on another component of network device 300, including, but not limited to computer-readable storage medium 328, hard disk drive 334, or the like. Data storage 308 may further store event data and metadata 310.

Event data and metadata 310 may include event data and/or related metadata received from another network device, such as client device 200 of FIG. 2. Data Storage 308 may further store a search index, which is described below in conjunction with FIGS. 4-8.

The mass memory also stores program code and data. One or more applications 314 are loaded into mass memory and run on operating system 306. Examples of application programs may include transcoders, schedulers, calendars, database programs, word processing programs, HTTP programs, customizable user interface programs, IPSec applications, encryption programs, security programs, SMS message servers, account managers, and so forth. Distributed Licensing Manager 316 includes License Master, Stack(s) and Pool(s) 317. Distributed Licensing Manager 316, Indexer 318 (optional), and Licensing Agent 320 (optional), may be included as application programs within applications 314.

Distributed Licensing Manager 316 may include virtually any computing component or components configured and arranged to manage and record event data and its related metadata. In one embodiment, Distributed Licensing Manager 316 may receive a license for a volume of a type of data, add the license to a corresponding stack of other licenses for that type of data, and enable the apportionment of the volume of data to a pool of indexers and/or a particular indexer such as one that is relatively local to the Distributed Licensing Manager. In at least one embodiment, Distributed Licensing Manager 316 may perform actions such as those described below in conjunction with FIGS. 4-8. Additionally, Indexer 318 and Licensing Agent 320 may be optionally included to locally index data in accordance with the licensed entitlements that correspond to the stack, and pool. Licensing Agent 320 is in communication with Indexer 318 and Distributed Licensing Manager 316, and provides the Distributed Licensing Manager with monitored information regarding the volume and type of data that is indexed by the Indexer. License Master 317 operates as a master to licensing agent 320 which is configured to operate as a slave.

10

General Operation

Figure 4:
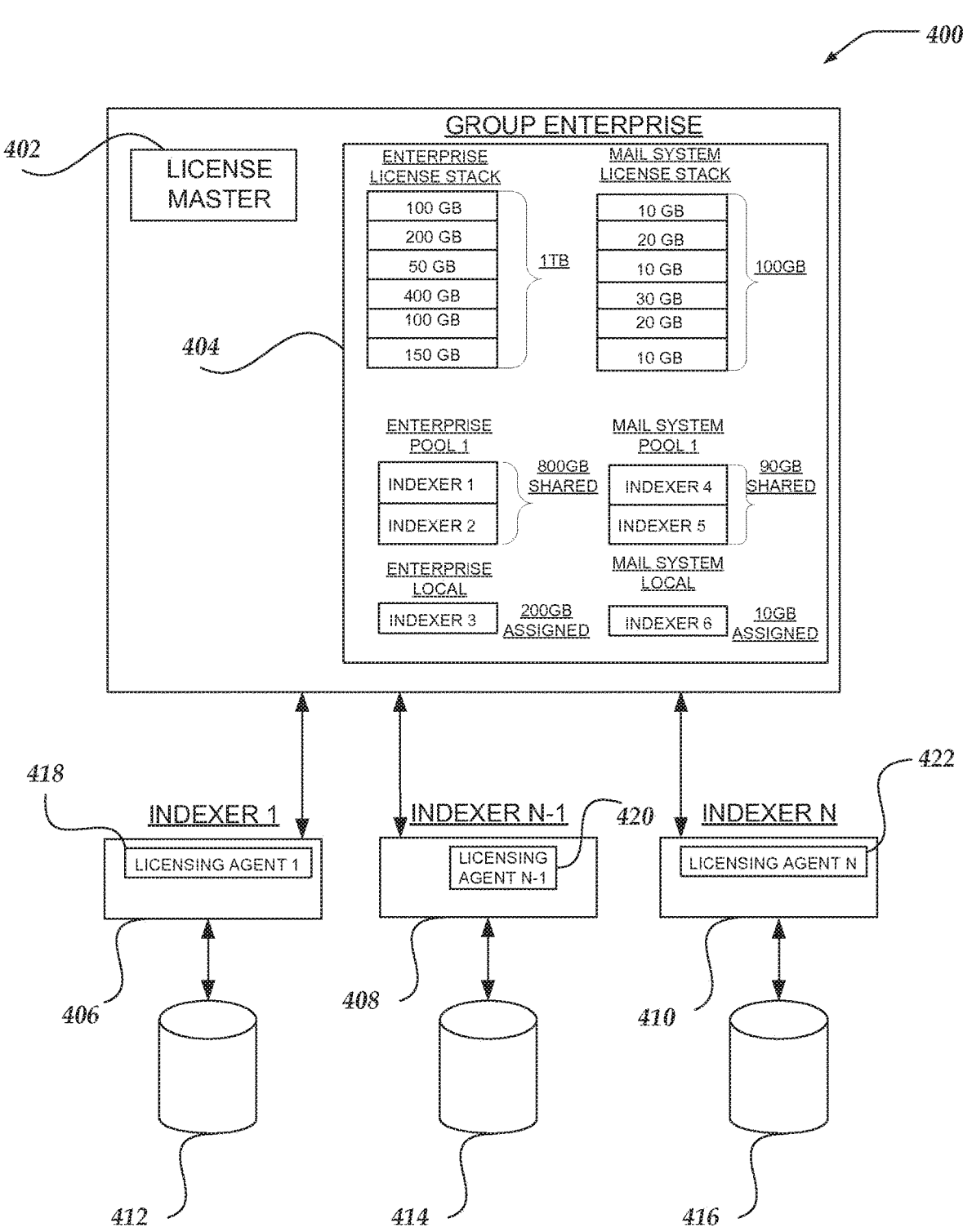
FIG. 4 illustrates the architecture for one embodiment of the invention.

The operation of certain aspects of the invention will now be described with respect to FIGS. 4-8. FIG. 4 illustrates an exemplary architecture for Distributed Licensing Manager 400. As shown, License Master 402 enables a user to organize Group Enterprise 404 to include two stacks of several licenses with corresponding pools. The Enterprise License stack organizes several licenses to provide an entitlement to index all types of data for a total volume of one Terabyte per day. Somewhat similarly, the Mail System License Stack organizes several licenses to provide an entitlement to index a particular type of data related to sending mail messages for a total volume of 100 gigabytes per day.

As shown, most of the volume corresponding to the licensed entitlement of each stack is distributed over a pool of indexers and the remainder volume is assigned to a particular indexer. For example, 800 gigabytes per day volume is assigned to Enterprise Pool 1 where the volume can be shared by indexers 1 and 2 or carved out in particular amounts, and the remainder 200 gigabytes per day of volume is assigned to indexer 3. In some embodiments, an assignment of volume to a particular indexer is warranted at least in part because the indexer may have extra capacity or is locally situated so that response time is improved for a user. Also, as shown, 90 gigabytes per day volume is assigned to Mail System Pool 1 where the volume is shared by indexers 4 and 5, and the remaining 10 gigabytes per day volume is assigned to indexer 6. Additionally, one through "n" indexers 406-410 are in communication with License Master 402. Indexers 406-410 include licensing agents 418-422 which are arranged to operate as slaves in communication with datastores 412-416.

For at least one embodiment, at initialization, License Master 402 builds an in-memory representation of the full license entitlements granted to a cluster of slave Indexers 406-410. These slaves are typically initialized with a master URI. Slave Indexers 406-410 keep tallies of their indexing totals for a given slice of time, and periodically report their usage up to License Master 402. License Master 402 then routes the various usages from various slave indexers to the correct pools and corresponding stacks of licenses. License Master 402 stores an in-memory summary of mappings relevant to tracking a slave Indexer's status in the cluster. Based on this representation, once a day License Master 402 can assess whether one or more slave Indexers are in violation of its daily volume quota based on rules that govern the license and perform an appropriate action for the violation. In at least one embodiment, these actions are serialized and relayed to the corresponding slave Indexer(s) as directives over the network. The slave Indexer executes the directive, which may include disabling search on the slave Indexer and/or notifying a user with a warning banner.

In at least one embodiment, in addition to License Master 402 having an in-memory representation of the slave Indexers' usage summary for a given day, this representation is also persisted on the individual slave Indexers in a secure manner. Upon first contact with License Master 402, a slave Indexer sends this persistent representation to the License Master to join the cluster of slave Indexers. Also, in at least one embodiment, the usage data stored on slave Indexers is broken up based on source types of data. In this way, License Master 402 can allocate the data usage to the appropriate stack based on its source type. Additionally, secure communication is maintained between master and slave with security techniques such as signing payloads with a symmetric key, and timestamps to avoid masquerading slaves and masters and replay attacks.

In at least one embodiment, an Application Programming Interface (API) is provided to query License Master 402 to determine the current state of the licensed entitlements and whether a feature is available or not. A user could view licensing details with the API via a User Interface (UI) as well as a Command Line Interface (CLI). In at least one embodiment, all time is maintained on License Master 402, and the slave Indexers store the master time in their persistent store. Since there is only one notion of time, time zone and daylight saving time issues between remotely located indexers is eliminated.

Figure 5A:
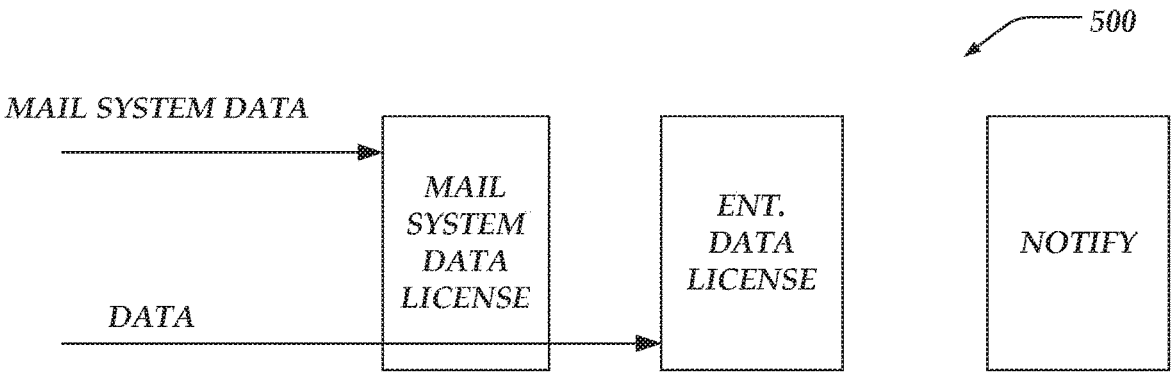
FIGS. 5A-5C illustrate logic flow for processing data in context with different types of licenses.
Figure 5B:
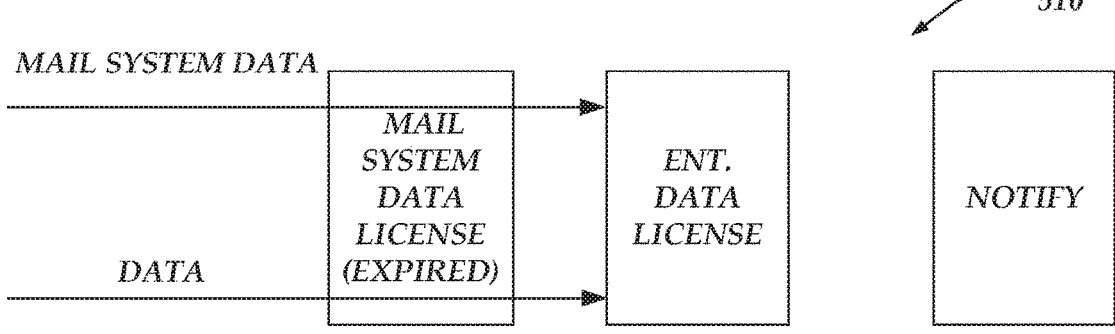
Figure 5C:
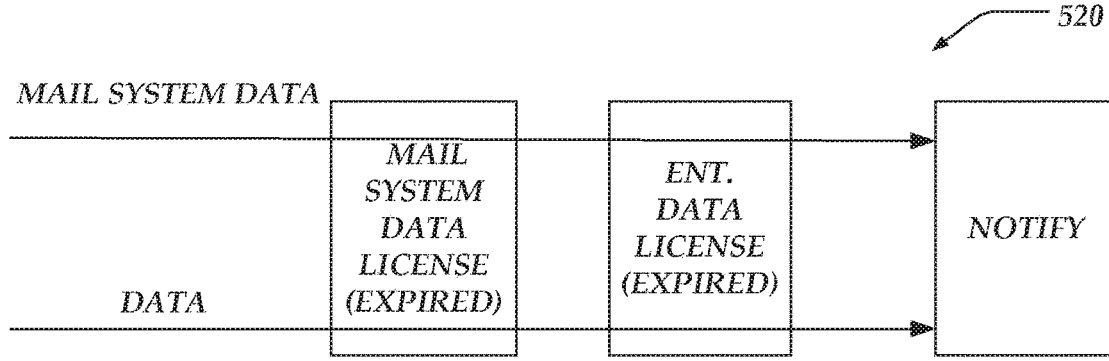

FIGS. 5A-5C show a process overview for debiting licenses across different stacks of licenses so that the most specific data type licenses are debited/metered first. In some instances, a license to index all types of data in an enterprise might be priced more expensively than another license that provides an entitlement to only index data for a particular application or for data associated with security.

As shown in FIG. 5A, overview 500 show a volume of data of the Mail System type that is debited to a Mail System Data License in a Mail System License stack which is configured to provide an entitlement to indexing for just Mail System type of data. Also, another volume of data of all other types but the Mail System type is debited to an Enterprise Data License in an Enterprise data stack which is arranged to provide an entitlement for all types of data.

In FIG. 5B, overview 510 shows a Mail System data license that is expired so that the volume of Mail System type of data is debited to the Enterprise Data License until a new Mail System Data License is acquired. Similarly, the volume of the other types of data is debited to the Enterprise Data License. In FIG. 5C, overview 520 shows a Mail System Data License and an Enterprise Data License that are both expired so that the volume for all of the data can not be debited. Instead, a notification is provided to the user regarding the undebited volume of data that is not being indexed.

In at least one embodiment, the user may be notified of a grace period to obtain a new license before the processing of the data stops. In at least another embodiment, a user might be offered a burst license to bridge a particular period of time of unexpectedly high volume of data.

FIG. 6 illustrates a logical flow diagram generally showing one embodiment of an overview process 600 for distributed licensing of a data limited application such as indexing. A non-exhaustive, non-limiting, example illustration of process 600 is also described below in conjunction with FIGS. 1-5, 7 and 8. In some embodiments, at least portions of process 600 of FIG. 6 may be implemented by and/or executed on a single network device, such as network device 300 of FIG. 3. In other embodiments, at least portions of process 600 may be implemented by and/or executed on a plurality of networked devices, such as shown in FIGS. 1-4.

Process 600 begins, after a start block, at block 602, where a user is provisioned with at least a license master and at last one indexer for indexing data. Moving to block 604, a user obtains at least one data volume license for at least one type of data to be indexed. Stepping to block 606, each data volume license is added to a stack of other data volume licenses that are configured for processing (indexing) the same type of data.

At block 608, the data volume capacity of each stack of licenses is configured for at least one pool of at least one indexer to process the corresponding type of data. Members of a pool can share the configured entitlement from a stack or they can be assigned a particular volume of data from the corresponding stack. Also, individual indexers in a pool can share the data volume entitlement, or they can receive an assignment of an entire entitlement.

Flowing to block 610, the process configures the data volume and type of data to be processed by each indexer in a cluster in accordance with a pool that they correspond to. Also, each indexer that is assigned an entitlement to a data volume for a data type separate from a pool is configured. At block 612, a data volume for a data type that is processed by one or more indexers is metered. If the daily quota of data volume is exceeded in regard to at least the stack/pool configuration and/or license entitlements, the licensing master notifies the user that another license is required for additional data volume for at least one type of data.

Moving to block 614, the process augments exceeded stack(s) with additional licenses for additional data volume for at least one corresponding type of data. The stacks that correspond to the data types of the new licenses are updated with the additional data volume. See FIG. 7 for more detail regarding this aspect of the process. Also, the pools of indexers and directly assigned indexers are updated with the additional data volume so that they can process the additional data volume. Next, the process returns to performing other actions.

Figure 7:
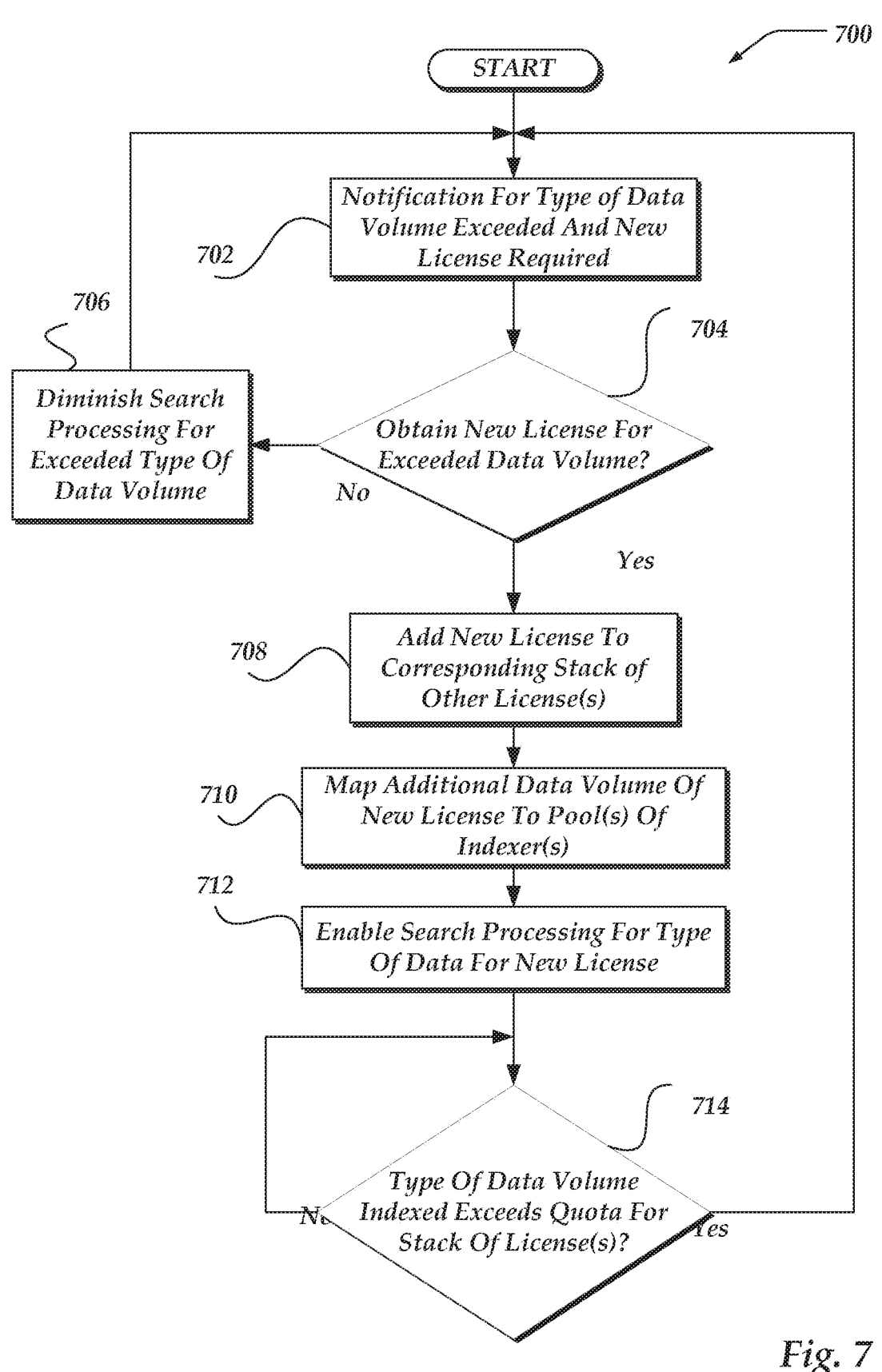
FIG. 7 illustrates a logical flow diagram generally showing at least one embodiment of a process for updating a license.

FIG. 7 illustrates a logical flow diagram generally showing one embodiment of an overview process 700 that further clarifies the updating of stacks of licenses when the data volume for a type of data is exceeded. Moving from a start block, the process steps to block 702 where a notification is received that a volume for a type of data is exceeded and a new license is required. At decision block 704, a determination is made as to whether a new license is obtained for the exceeded volume for a data type. If no, the process flows to block 706 where the search processing of the exceeded volume of the type of data is diminished in some manner. For example, search processing by a portion of the indexers whose entitlement of data volume is exceeded could be stopped and other indexers whose entitlement of data volume is not yet exceeded could be allowed to continue search processing. In at least one embodiment, all of the search processing by the indexers could be stopped until a new license is obtained. Also, in at least one embodiment, a grace period could be activated with full or diminished search processing to enable a user sufficient time to obtain a new license. In some embodiments, the new license could be defined for a relatively large burst of one or more types of data for a relatively short time span. In other embodiments, the new license could be defined for a relatively long period of time for one or more types of data. Additionally, an indexer generally continues indexing even though its search processing is diminished or stopped. Next, the process flows back to block 702 and performs substantially the same actions as discussed above.

However, if the determination at decision block 704 is affirmative, the process flows to block 708 where a new license is added to a stack of licenses that corresponds to the same type of data. At block 710, the additional volume for the type of data for the new license is mapped to one or more pools that include one or more indexers. At block 712, the indexers with the newly mapped volume for the type of data for the new license are enabled to process searches of data.

Flowing to decision block 714, the process monitors the volume for the type of data processed by the indexers. If the volume is not exceeded, the process continues monitoring. However, if the determination finds that the volume is exceeded, the process loops back to block 702 and continues performing substantially the same actions as described herein.

FIG. 8 illustrates an exemplary license as an XML file. As shown, a confidential digital signature is provided so that the license is unique, traceable, authentic, and the like. Also, the group_id is employed to determine which Group the license resides in. The creation and expiration times show the time period that the license covers. A plurality of features can be enabled and customized to a particular user/customer as discussed above. Also, one or more types of data or source types can be defined within the license.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. One or more non-transitory computer-readable storage media including instructions that, when executed by one or more processors, cause the one or more processors to perform steps of:

indexing, by a first computing device operating as a first indexer, a first type of first event data as first indexed data for searching;

transmitting, by the first indexer to a manager device, first monitored information generated by the first indexer and based on the first type of the first event data;

processing, by the manager device, the first monitored information to determine a first size of the first type of the first event data;

processing, by the manager device, second monitored information to determine a second size of the first type of the first event data that has been indexed by a second computing device operating a second indexer;

combining, by the manager device, the first size and at least the second size to determine a combined size of indexed data conducted by a plurality of indexers;

determining, by the manager device:

an indexing quota associated with a threshold size of the first type of the first event data that can be indexed by the plurality of indexers, and one or more corrective actions to be performed upon determining that the indexing quota has been exceeded;

determining, by the manager device, that the combined size of indexed data exceeds the indexing quota;

identifying, by the manager device, in response to determining that the combined size of the indexed data exceeds the indexing quota, a first corrective action from the one or more corrective actions;

outputting, by the manager device to the first indexer, one or more commands based on the first corrective action; and responding, by at least the first indexer to the one or more commands, by modifying further indexing operations on the first type of the first event data to ensure compliance with the indexing quota or obtaining an additional license to increase the indexing quota.

2. The one or more non-transitory computer-readable storage media of claim 1, wherein the first corrective action further includes disabling at least the first indexer from indexing additional first event data of the first type.

3. The one or more non-transitory computer-readable storage media of claim 1, wherein the first corrective action further includes disabling a computing feature of the first indexer.

4. The one or more non-transitory computer-readable storage media of claim 1, wherein the first corrective action further includes identifying a second indexing quota that is associated with all types of the first event data.

5. The one or more non-transitory computer-readable storage media of claim 1, wherein the instructions further cause the one or more processors to perform additional steps of:

identifying a second indexing quota associated with the first indexer; and determining that the first size of the first event data indexed by the first indexer is greater than the second indexing quota, wherein executing the first corrective action is further in response to determining that the first size of the first event data indexed by the first indexer exceeds the second indexing quota.

6. The one or more non-transitory computer-readable storage media of claim 1, wherein the instructions further cause the one or more processors to perform additional steps of:

identifying a second indexing quota associated with the first indexer; and determining that the first size of the first event data indexed by the first indexer is less than the second indexing quota; and canceling execution of the first corrective action in response to determining that the first size of the first event data indexed by the first indexer is less than the second indexing quota.

7. The one or more non-transitory computer-readable storage media of claim 1, wherein:

the indexing quota is further associated with a time period, and the combined size of the indexed data exceeds the indexing quota when the first type of the first event data included in the combined size of indexed data was indexed by the first indexer during the time period.

8. The one or more non-transitory computer-readable storage media of claim 1, wherein the instructions further cause the one or more processors to perform additional step of determining an expiration time associated with the indexing quota, wherein:

the expiration time disables one or more computing features that are associated with the indexing quota, and execution of the first corrective action is further based on reaching the expiration time.

9. The one or more non-transitory computer-readable storage media of claim 1, wherein:

the indexing quota is included in a stack, and the stack collects together a plurality of quotas that are each associated with the first type of the first event data.

10. The one or more non-transitory computer-readable storage media of claim 1, wherein:

the indexing quota is included in a pool, and the first indexer can use any quota included in the pool.

11. The one or more non-transitory computer-readable storage media of claim 1, wherein:

the indexing quota is included in a pool of licenses, and a third indexer can use any quota included in the pool.

12. A computer-implemented method, the method comprising:

indexing, by a first computing device operating as a first indexer, a first type of first event data as first indexed data for searching;

transmitting, by the first indexer to a manager device, first monitored information generated by the first indexer and based on the first type of the first event data;

processing, by the manager device, the first monitored information to determine a first size of the first type of the first event data;

processing, by the manager device, second monitored information to determine, a second size of the first type of the first event data that has been indexed by a second computing device operating a second indexer;

combining, by the manager device, the first size and at least the second size to determine a combined size of indexed data that has been indexed by a plurality of indexers including the first indexer and the second indexer;

determining, by the manager device:

an indexing quota associated with a threshold size of the first type of the first event data that can be indexed by the plurality of indexers; and one or more corrective actions to be performed upon determining that the indexing quota has been exceeded;

determining, by the manager device, that the combined size of indexed data exceeds the indexing quota;

identifying, by the manager device, in response to determining that the combined size of the indexed data exceeds the indexing quota, a first corrective action from the one or more corrective actions;

outputting, by the manager device to the first indexer, one or more commands based on the first corrective action; and responding, by at least the first indexer to the one or more commands, by modifying further indexing operations on the first type of the first event data to ensure compliance with the indexing quota or obtaining an additional license to increase the indexing quota.

13. The method of claim 12, wherein the first corrective action further comprises one or more of:

disabling at least the first indexer from indexing additional first event data of the first type, or disabling a computing feature of the first indexer.

14. The method of claim 12, further comprising determining, by the manager device, an expiration time associated with the indexing quota, wherein:

the expiration time disables one or more computing features that are associated with the indexing quota, and execution of the first corrective action is further based on reaching the expiration time.

15. A computing device, comprising:

a computer-readable memory that stores instructions, and a processor that is coupled to the computer-readable memory and, when executing the instructions, is configured to:

index, by a first indexer, a first type of first event data as first indexed data for searching;

transmit, by the first indexer to a manager device, first monitored information generated by the first indexer and based on the first type of the first event data;

process, by the manager device, the first monitored information to determine a first size of the first event data;

process, by the manager device, second monitored information to determine, a second size of the first type of the first event data that has been indexed by a second indexer;

combine the first size and the second size to determine a combined size of indexed data that has been indexed by a plurality of indexers including the first indexer and the second indexer;

determine, by the manager device:

an indexing quota associated with a threshold size of the first type of the first event data that can be indexed by the plurality of indexers, and one or more corrective actions to be performed upon determining that the indexing quota has been exceeded;

determine that the combined size of indexed data exceeds the indexing quota;

identify, in response to determining that the combined size of indexed data exceeds the indexing quota, a first corrective action from the one or more corrective actions; output, by the manager device to the first indexer, one or more commands based on the first corrective action; and respond, by at least the first indexer the one or more commands, by modifying further indexing operations on the first type of the first event data to ensure compliance with the indexing quota or obtaining an additional license to increase the indexing quota.

16. The computing device of claim 15, wherein the first corrective action further includes one or more of:

disabling at least the first indexer from indexing additional first event data of the first type, or disabling a computing feature of the first indexer.

* * * * *